US012791433B2

(12) United States Patent
Ortner et al.

(10) Patent No.: US 12,791,433 B2
(45) Date of Patent: Nov. 10, 2026

(54) WEAR PART, PRODUCTION METHOD AND DEVICE FOR MONITORING A STATE OF WEAR

(71) Applicant: KRONES AG, Neutraubling (DE)

(72) Inventors: Reinhard Ortner, Pfakofen (DE); Andreas Neuber, Altenstadt an der Waldnaab (DE)

(73) Assignee: KRONES AG, Neutraubling (DE)

( * ) Notice: Subject to any disclaimer, the term of this patent is extended or adjusted under 35 U.S.C. 154(b) by 511 days.

(21) Appl. No.: 18/268,274

(22) PCT Filed: Dec. 9, 2021

(86) PCT No.: PCT/EP2021/085024
§ 371 (c)(1),
(2) Date: Jun. 19, 2023

(87) PCT Pub. No.: WO2022/135960
PCT Pub. Date: Jun. 30, 2022

(65) Prior Publication Data

US 2024/0053226 A1 Feb. 15, 2024

(30) Foreign Application Priority Data

Dec. 22, 2020 (DE) ......................... 102020134672.7

(51) Int. Cl.
*G01M 13/00* (2019.01)
*B33Y 10/00* (2015.01)
*B33Y 80/00* (2015.01)

(52) U.S. Cl.
CPC ............ *G01M 13/00* (2013.01); *B33Y 80/00* (2014.12); *B33Y 10/00* (2014.12)

(58) Field of Classification Search
CPC ........ G01M 13/00; B33Y 80/00; B33Y 10/00; B33Y 30/00; B33Y 50/02; B65G 2207/48;
(Continued)

(56) References Cited

U.S. PATENT DOCUMENTS 5,601,180 A * 2/1997 Steeber .................. B65G 21/02 198/841
9,476,689 B2 10/2016 Steed et al.
(Continued)

FOREIGN PATENT DOCUMENTS

CN 106460980 A 2/2017
DE 102017216579 A1 3/2019
(Continued)

OTHER PUBLICATIONS

Printout from https://www.advancedsciencenews.com/3d-printing-with-nanoparticles/ (2020), printed May 16, 2025.
(Continued)

*Primary Examiner* — Xin Y Zhong
*Assistant Examiner* — Evan Mancini
(74) *Attorney, Agent, or Firm* — Caesar Rivise, PC

(57) ABSTRACT

The invention relates to a wear part (10E). The wear part (10E) has a part interior (14) and a wear layer (12E). The wear layer (12E) is produced by additive manufacturing, covers the part interior (14) and has a wear indicator (18E)
(Continued)

which is produced by additive manufacturing and is designed to indicate a state of wear of the wear part (10E) if the wear indicator (18E) is exposed and/or removed due to wear. Advantageously, the wear part (10E) can allow a simple wear monitoring by monitoring the wear indicator (18E).

17 Claims, 4 Drawing Sheets

(58) Field of Classification Search
CPC ................ Y02P 90/02; G05B 19/4184; G05B 2219/37256; G05B 19/4183
USPC .......................................................... 116/206
See application file for complete search history.

(56) References Cited

U.S. PATENT DOCUMENTS

| | | | |
|---|---|---|---|
| 11,045,917 B2 | 6/2021 | Koch et al. | |
| 11,052,598 B2 | 7/2021 | Neininger et al. | |
| 2004/0075218 A1 | 4/2004 | Heinzen | |
| 2016/0336149 A1* | 11/2016 | Larsson | H01J 37/32467 |
| 2017/0356165 A1* | 12/2017 | Serrurier | G06F 30/00 |
| 2018/0061696 A1* | 3/2018 | D'Ambra | G01N 21/64 |
| 2018/0319086 A1* | 11/2018 | Klammer | B29C 64/386 |
| 2019/0084111 A1* | 3/2019 | Koch | B33Y 80/00 |
| 2021/0030173 A1* | 2/2021 | Ross | A47G 9/02 |
| 2021/0162485 A1* | 6/2021 | Woidasky | B21D 5/02 |
| 2022/0063919 A1* | 3/2022 | Adam | B65G 15/62 |

FOREIGN PATENT DOCUMENTS

| | | | | |
|---|---|---|---|---|
| DE | 102017219542 A1 | 5/2021 | | |
| EP | 0258215 B1 | 10/1989 | | |
| EP | 3489158 A2 | 5/2019 | | |
| WO | 2015030582 A1 | 3/2015 | | |
| WO | 2016019431 A1 | 2/2016 | | |
| WO | 2017046418 A1 | 3/2017 | | |
| WO | 2017131702 A1 | 8/2017 | | |
| WO | 2017213784 A1 | 12/2017 | | |
| WO | WO-2019161902 A1 * | 8/2019 | | B23K 20/106 |
| WO | 2019192754 A1 | 10/2019 | | |
| WO | 2020129011 A1 | 6/2020 | | |

OTHER PUBLICATIONS

Printout from https://blog.agchemigroup.eu/whos-using-nanoproducts-in-coatings-and-paints/ (2020), printed May 16, 2025.

Challagulla et al. (2020). Recent developments of nanomaterial applications in additive manufacturing: a brief review. Current Opinion in Chemical Engineering, 28: 75-82.

English Abstract for DE 102017219542 A1 (2021).

English Abstract for EP 3489158 A2 (2019).

* cited by examiner

WEAR PART, PRODUCTION METHOD AND DEVICE FOR MONITORING A STATE OF WEAR

CROSS-REFERENCE TO RELATED APPLICATIONS

This application is a U.S. National Phase Application of PCT/EP2021/085024, filed Dec. 9, 2021, which claims priority to DE 102020134672.7, filed Dec. 22, 2020, the contents of which applications are incorporated herein by reference in their entireties for all purposes.

TECHNICAL FIELD

The invention relates to a wear part, to a device for monitoring a state of wear, to a method for producing a wear part, and to a computer program product.

TECHNICAL BACKGROUND

A current development trend in manufacturing is what is known as 3-D printing, also known under the names of additive manufacturing, generative manufacturing, or rapid technologies. In 3-D printing, materials can be applied layer-by-layer, thus producing three-dimensional objects.

This opens up the possibility of printing wear parts, as required, by means of 3-D printers. For example, the costs for storing wear parts can thus be reduced. Likewise, long delivery times for the wear parts can be avoided by means of 3-D-printed wear parts, since there is the possibility of printing the wear parts directly on-site or at least close to the place of use.

Conventionally, the parts are printed by the 3-D printer only on the basis of the prespecified geometry, with a homogeneous material.

The invention is based upon the object of providing improvements with respect to 3-D-printed wear parts.

SUMMARY OF THE INVENTION

The object is achieved by the features of the invention.

One aspect of the present disclosure relates to a wear part (for example, partially or completely produced by additive manufacturing—preferably 3-D-printed)—preferably for a container processing system (for example, for manufacturing, cleaning, testing, filling, closing, labeling, printing, and/or packaging containers for liquid media—preferably beverages or liquid food). The wear part (for example, in an unworn state) has a part interior (for example, produced by additive manufacturing—preferably 3-D-printed) and a wear layer. The wear layer is produced by additive manufacturing—preferably 3-D printing—and covers the part interior (for example, partially or completely). The wear layer has a wear indicator which is produced by means of additive manufacturing—preferably by means of 3-D printing—and is configured to indicate (for example, visually, electrically, and/or haptically) a state of wear of the wear part (or to reveal a state of wear of the wear part)—preferably if the wear indicator is exposed and/or removed due to wear.

Advantageously, the wear part can make it possible to easily monitor the wear by monitoring the wear indicator. The wear indicator can be adapted individually to the manner of wear. The wear indicator can make it possible that the wear part not be replaced too early, but only when the wear layer is completely worn, for example. In addition, failure of the wear part can be detected at an early stage, such that unforeseen downtimes/maintenance work can be reduced. The wear indicator can also enable an immediate assessment in the event of damage and/or in a warranty period. Furthermore, monitoring the wear indicator allows for collecting data about the wear of the wear part, as a result of which it may be possible to optimize the wear part and/or the machine comprising the wear part.

In one exemplary embodiment, the wear layer has a cover layer which covers the wear indicator when the wear part is in an unworn state. Advantageously, the wear indicator can consequently be arranged deeper in the wear layer and, for example, only indicate the state of wear when it is exposed (and/or later removed).

In a further exemplary embodiment, the wear indicator, when the wear part is in the unworn state, forms a part surface of the wear part or is included in a part surface of the wear part. Advantageously, the wear indicator can therefore indicate the state of wear when it is removed—for example, at points or in regions. In addition, the wear indicator can reduce the risk of confusion when the wear part is replaced, since the wear indicator can be fixed to the wear part, for example. The safety of the system can thus be increased.

In a further exemplary embodiment, the wear indicator is at least partially formed by an electrical conductor—preferably a conductor track or a conductive layer. Preferably, electrical monitoring of the wear indicator can thus take place. The electrical monitoring can be used in many ways—for example, for early detection of wear-related component failure, and for reporting to a local and/or remote user interface. By means of the electrical conductor, it is also possible to determine loads on the wear part and load cycles of the wear part.

Alternatively or additionally, the wear indicator is at least partially formed by a coloration, structuring, texturing, change in hardness (for example, hardening or reduction in hardness), change in material, and/or nanoparticle embedding of the wear layer, at least in regions or in layers. Alternatively or additionally, the wear indicator is at least partially formed by a visual code—preferably a color code, a barcode, or a matrix barcode (for example, QR code). Advantageously, these features can be visually detected and categorized in a simple manner, without subsequent measurements. It is possible for material and weight to be saved upon by a heterogeneous structure of the wear part. It is also possible for mechanical properties (stiffness, hardness, strength, flexural/expansion stiffness, elasticity, etc.) to be varied in a targeted manner. This can have the advantage that the functionality of the wear part can be controlled in a targeted manner if, by way of example, after wear of a hard wear indicator layer (for example, with green or yellow coloration), the underlying, softer wear indicator layer (for example, red coloration) is subjected to wear, and thus, for example, a collision in the machine can be avoided. Likewise, the features can contribute to preventing counterfeiting or unauthorized retrofitting of the wear parts, since they can be combined with specific side features provided by the manufacturer—for example, a special manufacturer code, special manufacturer color, special manufacturer structure, etc.

In one exemplary embodiment, the wear layer has a further wear indicator, which differs from the wear indicator, arranged closer to the part interior than the wear indicator, which is additively manufactured—preferably 3-D-printed—and which is configured to indicate (for example, visually, electrically, and/or haptically) a further state of wear of the wear part (or to reveal a further state of wear of the wear part)—preferably if the further wear indicator is exposed and/or removed due to wear. Optionally, the wear layer can have another, further wear indicator, which differs from the wear indicator and the further wear indicator, arranged closer to the part interior than the further wear indicator, which is additively manufactured—preferably 3-D-printed—and which is configured to indicate (for example, visually, electrically, and/or haptically) another, further state of wear of the wear part (or to reveal another, further state of wear of the wear part)—preferably when the other further wear indicator is exposed and/or removed due to wear. Advantageously, it can thus be made possible that several different states of wear can be indicated in succession—for example, a low state of wear and an advanced state of wear.

In a further embodiment, the further wear indicator and, optionally, the other further wear indicator is/are at least partially formed by an electrical conductor—preferably a conductor track or a conductive layer—and/or a coloration, structuring, texturing, change in hardness (for example, hardening or hardness reduction), change in material, and/or nanoparticle embedding of the wear layer, and/or a visual code—preferably a color code, a barcode, or a matrix barcode (for example, QR code)—at least in regions or in layers.

In one embodiment variant, the wear indicator and the further wear indicator and, optionally, the other further wear indicator are each formed by a coloring of the wear layer designed in layers—preferably in the manner of a traffic light system (for example, green-yellow-red or yellow-red or green-red) and/or with a color gradient. Advantageously, with an individually configurable color spectrum, one of multiple states of wear can thus be particularly easily recognized visually and categorized, without subsequent measurements.

In a further embodiment variant, the wear part is a container clamp for holding a container, a container guide for guiding containers, a closure channel for conveying container closures, a blocking star for interrupting a feed of containers, a bushing, a toothed wheel, a roller, or a guide.

A further aspect of the present disclosure relates to a device for monitoring a state of wear. The device has a wear part as disclosed herein and a monitoring device. The monitoring device is configured to monitor the wear part with respect to the wear indicator (for example, during operation and/or an operating stoppage of a machine comprising the wear part) and preferably to output an indication signal if the wear indicator indicates the state of wear. Advantageously, the device can thus enable automatic monitoring of the wear of the wear part. This can also make it possible, for example, for replacement parts to be ordered at an early stage or to be subsequently printed. As a result, an "on-demand" or, ideally, "just-in-time" procurement can preferably be possible, which ensures minimal system downtime.

In one exemplary embodiment, the device further has an optical sensor (for example, camera or spectroscope) which is situated for detecting the wear part. The monitoring device is configured to detect the wear indicator in a signal from the optical sensor, and preferably to output the indication signal when the wear indicator is detected. Preferably, one or more visual wear indicators can thus be monitored.

In a further exemplary embodiment, the device further has an electrical circuit which is connected to the wear indicator when the wear part is in an unworn state. The monitoring device is configured to monitor at least one electrical parameter (for example, resistance, current, voltage) of the electrical circuit. Preferably, one or more electrical wear indicators can thus be monitored.

In a further exemplary embodiment, the monitoring device is further configured to output the indication signal when the electrical circuit is interrupted (for example, by the removal of the wear indicator) and/or in the case of a preferably permanent change in the at least one electrical parameter (for example, by the removal of the wear indicator). In this way, it is preferably possible to automatically detect, for example, if the wear part has been worn to the extent that it has to be replaced.

In a further exemplary embodiment, the monitoring device is further configured to determine a load state of the wear part as a function of a degree of change in the event of a preferably temporary change in the at least one electrical parameter, and to output a signal indicating the determined load state, and/or to output a signal if the determined load state is greater than a prespecified maximum load state. In this way, knowledge about the operation of the machine and the loads on the wear part can preferably be obtained, such that both the machine and the wear part can be improved. It is also possible to automatically detect excessive loads on the wear part which require replacement of the wear part and/or adaptation of the configuration or operation of the machine comprising the wear part.

In a further exemplary embodiment, the monitoring device is further configured to determine (for example, count) a number of load cycles as a function of a number of preferably temporary changes in the at least one electrical parameter, and to output a signal indicating the number of load cycles, and/or to output a signal if the determined number of load cycles is greater than a prespecified maximum load cycle number. In this way, knowledge about the operation of the machine and the loads on the wear part can likewise preferably be obtained, such that both the machine and the wear part can be improved. It is also possible to automatically detect an excessively high number of load cycles, which may make replacement of the wear part necessary.

It is also possible for the wear part to be used as a component in so-called predictive maintenance. As part of a digitization process (factory of the future) and in the context of intelligent—for example, self-learning—characteristics necessary for this purpose, it may be necessary to digitize components—that is, to make them "intelligent." This means that they are provided with an identity (IP) and can provide information independently. This can take place, for example, via RFID or the like. In a combination of such a chip with the inserted conductive regions, a wear part that can be discretely addressed via the associated IP can deliver an electrical signal about its state—either continuously or at intervals. If the resistance in the wear part changes due to wear, this information can be transmitted to the machine controller—in particular, the central machine controller and/or the line controller (for example, via a cloud solution)—and compared with different programs.

In one embodiment, the monitoring device is configured to monitor the wear part with respect to the further wear indicator, and preferably to output a further indication signal that differs from the indication signal if the further wear indicator indicates the further state of wear. Optionally, the monitoring device can also be configured to monitor the wear part with respect to the other further wear indicator, and preferably to output another, further indication signal that differs from the indication signal and from the further indication signal if the other further wear indicator indicates the other further state of wear. Preferably, the wear part can thus be automatically monitored for multiple states of wear, as a result of which progressive wear of the wear part can be detected.

In a further embodiment, the monitoring device is configured to output the indication signal (and, optionally, any other signal of the monitoring device disclosed herein) visually and/or acoustically and/or haptically, and/or to a control unit and/or to a local user interface and/or to a remote user interface. Advantageously, it can be made possible that users are informed about the state of wear, and/or a control unit of the machine comprising the wear part be adapted to the state of wear of the wear part. The user can be informed locally and/or remotely about the state of wear, as a result of which, for example, the manufacturer can also remotely monitor the machine or the wear part.

In a further embodiment, the monitoring device is part of a local (for example, machine or system) control unit and/or a server-based—preferably web-based—remote machine monitoring system. The integration into the control unit can enable a rapid-reaction, simple adjustment of the operation of the machine as a function of the wear of the wear part. The remote machine monitoring system can enable remote monitoring of the machine or the wear part by the manufacturer. This can enable variable services from the manufacturer, since the actual state of the components/modules of the system maps the real operating conditions. For example, in the remote machine monitoring system, a request can be presented to service personnel, who can decide which further steps to take—for example, replacement or manual verification by the technician on-site. The latter can also optionally obtain the information (for example, via an app, if the manufacturer has previously issued the credentials). Alternatively or additionally, an automated demand release and scheduling for the replacement is also conceivable, without a person having to intervene.

In a further embodiment, the device further has a machine (for example, a conveyor or a container processing machine in a container processing system), wherein the machine has the wear part.

In a further embodiment, the monitoring device is configured to adjust an operation of the machine if the wear indicator indicates the state of wear. For example, in the event of heavy wear of the wear part, the machine can be stopped, or a power or a throughput of the machine can be reduced.

In a further aspect, the present disclosure relates to a method for producing a wear part—preferably as disclosed herein—for example, by means of a 3-D printer, fused layer modeling/manufacturing (FLM), fused filament fabrication (FFF), fused deposition modeling (FDM), SLS multimaterial printing, polyjet, or stereolithography. The method includes additive manufacturing—preferably 3-D printing—of a wear layer of the wear part, which has a wear indicator which is additively manufactured—preferably 3-D-printed—and is configured to indicate (for example, visually, electrically, and/or haptically) a state of wear of the wear part (or to reveal a state of wear of the wear part)—preferably if the wear indicator is exposed and/or removed due to wear.

Preferably, the method can further feature 3-D printing of a part interior of the wear part.

It is possible for the wear part, the wear layer, the wear indicator(s), and/or the part interior to be produced substantially from a polymer material—preferably 3-D-printed, and preferably with the addition of an ink or a technical additive for coloring and/or increasing the electrical conductivity (if desired).

Preferably, the term, "control unit," can refer to an electronic system (for example, with microprocessor(s) and data memory) and/or a mechanical, pneumatic, and/or hydraulic controller which can take over control tasks and/or regulating tasks and/or processing tasks, depending upon the design. Although the term, "control," is used herein, this can also comprise or be understood as "regulate" or "feedback-control" and/or "process."

A further aspect of the present disclosure relates to a computer program product having (for example, at least one computer-readable storage medium having stored thereon) instructions that cause an additive manufacturing apparatus (for example, 3-D printer) to carry out a method as disclosed herein or to produce a wear part as disclosed herein in a plurality of layers in an additive manufacturing process.

The preferred embodiments and features of the invention described above can be combined with one another as desired.

BRIEF DESCRIPTION OF THE FIGURES

Further details and advantages of the invention are described below with reference to the appended drawings. In the drawings.

Figure 1:
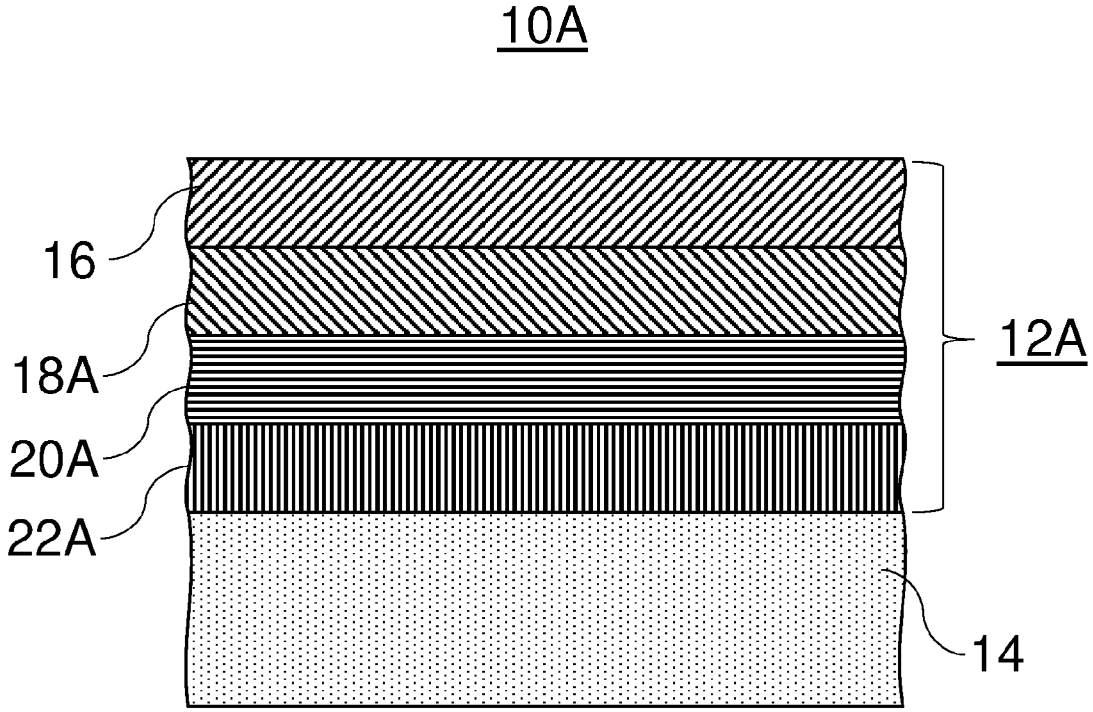
FIG. 1 is a schematic sectional view through an unworn wear part according to an exemplary embodiment of the present disclosure.

The embodiments shown in the figures correspond at least in part, so that similar or identical parts are provided with the same reference numbers (and, optionally, different appended letters), and so that reference is also made to the description of other embodiments or figures for the explanation thereof, to avoid repetition.

DETAILED DESCRIPTION OF EXEMPLARY EMBODIMENTS

FIGS. 1 through 5C show, purely schematically, a wear part 10A-10E in different embodiments. The wear part 10A-10E is preferably included in a container processing system for manufacturing, cleaning, checking, filling, closing, labeling, printing, and/or packaging containers for liquid media—preferably beverages or liquid foods. In the container processing system, the wear part 10A-10E can wear, for example, due to continuous contacts with for example, containers or container closures. Preferably, the wear part 10A-10E may be a container clamp (for example, neck handling clamp) for holding a container (for example, the container neck or the container jacket), a container guide for guiding containers, a closure channel for guiding container closures, a blocking star for interrupting a container flow, any bushing, any toothed wheel, any roller, or generally any guide.

However, the techniques disclosed herein with respect to the wear part 10A-10E can be used not just in a container processing system. Generally, the wear part 10A-10E can be usable in any environment in which wear parts are used, for example, in any machine, any system, any vehicle, etc.

The wear part 10A-10E has a wear layer 12A-12E and a part interior 14. The wear layer 12A-12E partially or completely covers the part interior 14. The wear layer 12A-12E preferably covers at least one side of the part interior 14. During the intended use of the wear part 10A-10E, the wear layer 12A-12E continues to wear in a direction towards the part interior 14. The wear is a progressive material loss from a surface of the wear layer 12A-12E, which is typically brought about by mechanical causes—for example, by contact and movement relative to a solid, liquid, or gaseous counter body. In other words, a progressive mass loss (surface removal) of the wear layer 12A-12E occurs during wear—for example, by grinding, rolling, striking, scratching, and chemical and thermal stress.

The wear part 10A is a 3-D-printed part in which at least the wear layer 12A-12E is produced by means of 3-D printing. Preferably, the part interior 14 is also produced by means of additive manufacturing—preferably by means of 3-D printing. The wear layer 12A-12E (and, optionally, the part interior 14) is additively produced layer-by-layer—preferably 3-D-printed. A 3-D printing technique can, for example, be fused layer modeling/manufacturing (FLM or fused filament fabrication (FFF)) or fused deposition modeling (FDM), SLS multimaterial printing, polyjet, or stereolithography. Preferably, plastic materials (for example, polymers, such as polyamide or thermoplastics) are printed in the 3-D printing. It is possible for the 3-D printer to be able to add so-called functional agents (so-called technical additives) during printing—for example, in the form of inks, etc.

One special feature of the present disclosure is that the wear layer 12A-12E has at least one wear indicator 18A-32B. In the unworn state of the wear part 12A-12E, the wear indicators 18A-32B can be covered by a cover layer 16 of the wear layer 12A-12E. In the unworn state of the wear part 10A, the wear indicators 18A-32B may therefore not be visible from the outside. Alternatively, however, it may also be possible for no cover layer 16 to be present. In particular, for example, the wear indicator 18A-18E, in the unworn state of the wear part 10A-10E, can then form a part surface of the wear part 10A-10E or be included in a part surface of the wear part 10A-10E.

With progressive wear of wear layer 12A-12E, wear indicators 18A-32B are exposed and removed. If no cover layer 16 is present, the wear indicators 18A-18E are already initially exposed in the unworn state of the wear part 10A-10E. If several wear indicators 18A-32B are included in the wear layer 12A-12E, the wear indicators 18A-32B are preferably exposed and removed one after the other. The wear layer 12A-12E can be partially or completely formed by the wear indicators 18A-32B.

Depending upon the design of the wear indicators 18A-32B, these can be indicative of a respectively associated state of wear of the wear part 10A-10E during wear-related exposure and/or removal—preferably visually, electrically, and/or haptically. If several wear indicators 18A-32B are included, they are preferably exposed and removed one after the other during the wear of the wear layer 12A-12E, so that they can successively indicate increasing or greater states of wear of the wear part 10A-10E. Of the wear indicators 18A-32B, the wear indicator which is arranged, in the unworn state of the wear part 10A-10E, nearest/closest to the part surface of the wear layer 12A-12E can indicate a (first) state of wear. The wear indicator of the wear indicators 18A-32B which is arranged, in the unworn state of the wear part 10A-10E, in the next-closest position to the part surface of the wear layer 12A-12E indicates a further or second state of wear. The second state of wear characterizes wear of the wear layer 12A-12E and the wear part 10A-10E, which is further advanced than the first state of wear. The wear indicator of the wear indicators 18A-32B which is arranged in the unworn state of the wear part 10A-10E at the third-closest position to the part surface of the wear layer 12A-12E indicates another, further, or third state of wear, etc.

The monitoring of the wear part 10A-10B with respect to the wear indicators 18A-32B can take place, for example, manually by a user/technician. The user may check the wear part 10A-10E, for example, at random or prespecified intervals—for example, visually and/or haptically. However, it is also possible for the monitoring of the wear indicators 18A-32B to be carried out in a system-assisted manner, and, optionally, fully automatically, as described later by way of example with reference to FIG. 6.

The wear indicators 18A-32B can indicate the respectively assigned states of wear in different ways. The indication can preferably be visual, haptic, and/or electrical. The wear indicators 18A-32B can preferably be formed at least partially by an electrical conductor, by a coloring/dye, structuring, texturing, change in hardness, change in material, and/or nanoparticle embedding (in) of the wear layer 12A-12E, at least in regions or in layers, and/or a visual code. The aforementioned examples can be implemented individually or in any combination in a single wear indicator 18A-32B. For example, at least one of the wear indicators 18A-32B can be both colored and structured, and/or textured. Each of the wear indicators 18A-32B is different from the cover layer 16 (if present) and from the part interior 14, so as to delimit them from one another.

For example, at least one of the wear indicators 18A-32B can be at least partially formed by an electrical conductor. The electrical conductor can preferably be configured as a conductor track or a conductor layer. The electrical conductor can, for example, be added as an electrically-conductive additive (for example, a so-called "agent") during 3-D printing to a non-conductor base material (for example, a polymer) to form the electrical conductor. It is also possible for the 3-D printer to directly print an electrically-conductive material which is integrated or embedded in the rest of the wear layer 12A-12E made of a polymer material. The polymer material can, for example, be dispensed from a print head or an extrusion die of the 3-D printer. The electrically-conductive material or the electrically-conductive additive can be delivered, for example, from a further print head or a further extrusion die of the 3-D printer. Apart from the electrical conductor or the electrical conductors, the wear layer 12A-12E is preferably an electrical non-conductor (for example, having an electrical conductivity of less than 10E-8 S·cm-1). Preferably, the part interior 14 is an electrical non-conductor (for example, with an electrical conductivity of less than 10E-8 S·cm-1). The electrical conductor can preferably indicate the associated state of wear electrically. However, it is also possible for the electrical conductor to be visually indicative of the associated state of wear, since it can be visually distinguished from its surroundings, and/or be haptically indicative because it can be distinguished tactilely and/or by touch from its surroundings.

For example, at least one of the wear indicators 18A-32B can be formed at least in part by a coloring/dye of the wear layer 12A-12E, at least in regions or layers. The color or coloration of the wear layer 12A-12E can be provided in different ways during 3-D printing of the wear layer 12A-12E. For example, differently colored materials—preferably plastic materials—can be printed by the 3-D printer, for example, from different print heads or extrusion nozzles of the 3-D printer. It is also possible, for example, for a base material—preferably a polymer base material—to be dyed as desired during printing with different dyes (for example, in the form of inks, powders, or particles) in order to provide the coloring. The wear layer 12A-12E, aside from the coloring/coloration, is preferably uncolored or colored differently. Preferably, the part interior 14 is also uncolored or colored differently. If the wear layer 12A-12E is colored in several layers or portions for several wear indicators, the colors of the several colored layers or portions are preferably different. For example, a traffic light system (for example, yellow to red, or green to red, or green to yellow to red) or a color gradient can be created, proceeding from a part surface towards the part interior 14, by the colored layers or portions. The coloring can preferably visually indicate the associated state of wear.

For example, at least one of the wear indicators 18A-32B can be formed at least in part by structuring and/or texturing the wear layer 12A-12E, at least in regions or layers. The structuring and/or texturing can be created directly as a two- or three-dimensional geometry (for example, lattice structure) during 3-D printing. The wear layer 12A-12E, aside from the structuring and/or texturing, is preferably structured and/or textured differently. Preferably, the part interior 14 is likewise structured and/or textured differently. If the wear layer 12A-12E is structured and/or textured in several layers or portions for several wear indicators, the structuring and/or texturing of the several structured and/or textured layers or portions is preferably different. The structuring and/or texturing can indicate visually and/or haptically the associated state of wear.

For example, at least one of the wear indicators 18A-32B can be formed at least in part by a change in hardness of the wear layer 12A-12E, at least in regions or layers. For example, a hardening or hardness reduction (softening) of the wear layer 12A can be brought about by 3-D printing of materials of different hardness. For example, when the wear layer 12A-12E is printed, the 3-D printer can selectively print either a first material (for example, a polymer) or a second material (for example, another polymer), which are different in hardness, so that regions or layers of the wear layer 12A-12E with different hardness can be created. The differently hard (or soft) materials can, for example, be dispensed from different print heads or extrusion nozzles of the 3-D printer. It is also possible, for example, for a base material—preferably a polymer base material—to be mixed selectively with a hardening or softening additive during printing. Apart from the hardened region or the hardened layer, the wear layer 12A-12E preferably has a different, and preferably homogeneous, hardness. Preferably, the part interior 14 has a different hardness than the hardened region or the hardened layer. If the wear layer 12A-12E has several hardened layers or portions, these are preferably hardened differently. For example, a hardness gradient from hard to soft or soft to hard can be created, proceeding from a part surface towards the part interior 14 by the hardened layers or portions. The change in hardness can be haptically indicative of the associated state of wear.

For example, at least one of the wear indicators 18A-32B can be formed at least in part by a change in material of the wear layer 12A-12E, at least in regions or layers. For example, a change in material of the wear layer 12A can be brought about by 3-D printing of different materials. For example, when printing the wear layer 12A-12E, the 3-D printer can selectively print a first material (for example, a polymer) or a second material (for example, another polymer), so that regions or layers of the wear layer 12A-12E can be created with different materials. The different materials can, for example, be dispensed from different print heads or extrusion nozzles of the 3-D printer. It is also possible, for example, for a base material—preferably polymer base material—to be mixed selectively with a material additive during printing in order to bring about a change in material. The wear layer 12A-12E is preferably, aside from the material-modified region or the material-modified layer, of a different material. Preferably, the part interior 14 is of a different material than the material-modified regions or layers. If the wear layer 12A-12E is of several material-modified layers or portions, these preferably are of different materials. The change in material can indicate the associated state of wear visually, haptically, and/or electrically, for example.

For example, at least one of the wear indicators 18A-32B can be formed at least in part by nanoparticle embedding of the wear layer 12A-12E, at least in regions or in layers. For example, when the wear layer 12A-12E is printed, the 3-D printer can selectively add nanoparticles in the form of an additive, or not. The nanoparticle embeddings can change the material properties. The wear layer 12A-12E preferably does not have nanoparticle embeddings, aside from the mentioned regions or layers of the wear indicator. Preferably, the part interior 14 has no nanoparticle embeddings. The nanoparticle embeddings can indicate the associated state of wear—for example, visually, haptically, and/or electrically.

For example, at least one of the wear indicators 18A-32B can be at least partially formed by a visual code. The visual code can be created directly as a two- or three-dimensional geometry during 3-D printing. For example, the visual code may have a color code, a barcode, or a matrix barcode (for example, QR code). Aside from the visual code, the wear layer 12A-12E preferably does not have any further visual code. Preferably, the part interior 14 has no visual code. The visual code can indicate visually and/or haptically the associated state of wear.

A height of the wear indicators 18A-32B in a direction perpendicular to the part surface of the wear layer 12A-12E lying above can be selected, depending upon the application. The height of wear indicators 18A-32B may be individually selected for each wear part 10A-10E, since there are components for which more wear is permitted, and others that allow hardly any wear. For example, the wear indicators 18A-32B can have a very low height—for example, in the two-digit μm range (for example, above 80 μm and/or 10E-8 S·cm-1), or in the three-digit μm range.

The exemplary embodiments of FIGS. 1 through 5C are described in succession below. The number of wear indicators 18A-32B in each case can be varied, depending upon requirements. The design of the wear indicators 18A-32B in each case can also be varied, depending upon requirements.

FIG. 1 shows the wear part 10A, with the wear layer 12A formed of the optional cover layer 16 and the wear indicators 18A, 20A, and 22A. The wear indicators 18A, 20A, 22A are each layers or portions of layers of the wear layer 12A. In a direction from the outside towards the part interior 14, the wear indicator 18A follows the cover layer 16. The wear indicator 20A follows the wear indicator 18A. The wear indicator 22A follows the wear indicator 20A. The part interior 14 follows the wear indicator 22A. As wear progresses, the wear indicator 18A is first exposed and removed. The wear indicator 20A is then exposed and removed. Finally, the wear indicator 22A is exposed and removed.

The wear indicators 18A, 20A, 22A are preferably embodied as different colors of the wear layer 12A. The wear indicators 18A, 20A, 22A can thus indicate visually the respective states of wear. The wear indicators 18A, 20A, 22A can preferably have the colors of a traffic light system. For example, the wear indicator 18A can be green. Accordingly, the wear indicator 18A, when it is exposed due to wear, can indicate that the wear part 10A is hardly worn, or has a low degree of wear. The wear indicator 20A can be yellow, for example. Accordingly, the wear indicator 20A can indicate that the wear part 10A has already been noticeably worn, or has an average degree of wear, but is still functional. The wear indicator 22A can be red, for example. Accordingly, the wear indicator 22A, when exposed due to wear, may indicate that the wear part 10A is very worn, and/or has a high degree of wear, and should be replaced. Once the wear indicator 22A has been completely removed, the wear part 10A can no longer function reliably, or may even cause damage in the machine. The cover layer 16 and the part interior 14 can preferably not be colored, or be colored with a different color.

Figure 2:
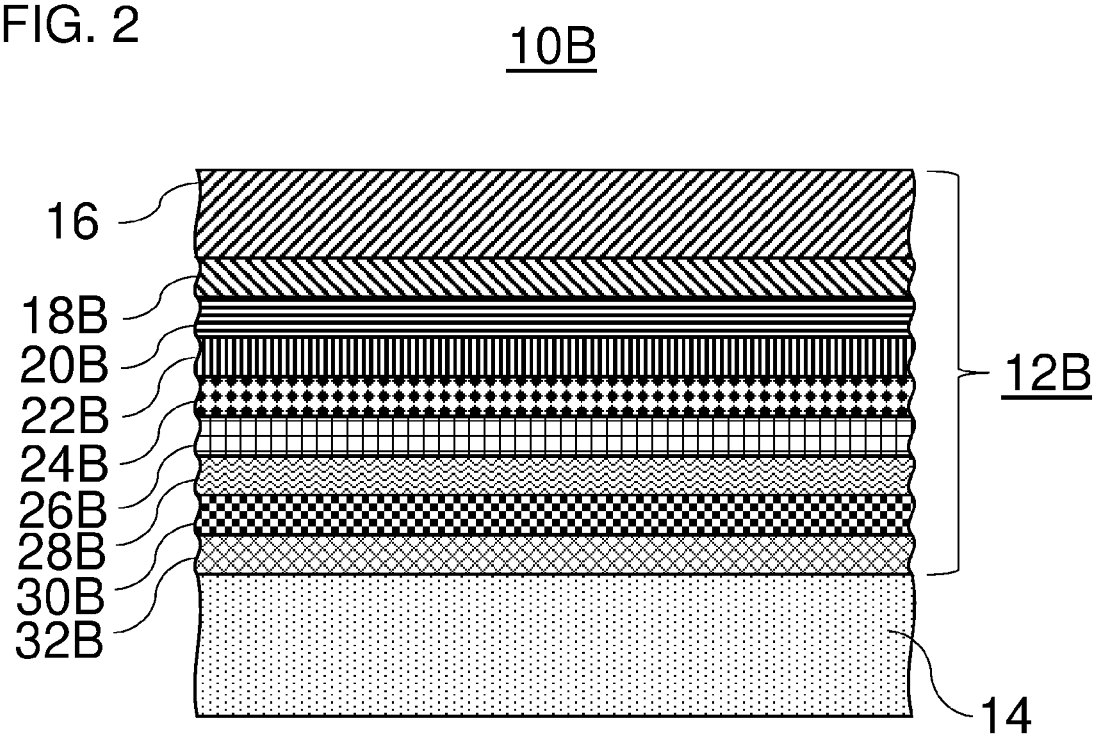
FIG. 2 is a schematic sectional view through an unworn wear part according to an exemplary embodiment of the present disclosure.

FIG. 2 shows the wear part 10B with the wear layer 12B formed of the optional cover layer 16 and the wear indicators 18B, 20B, 22B, 24B, 26B, 28B, 30B, 32B. The wear indicators 18B, 20B, 22B, 24B, 26B, 28B, 30B, 32B are each layers or portions of layers of the wear layer 12B. In a direction from the outside towards the part interior 14, the wear indicator 18B follows the cover layer 16. The wear indicator 20B follows the wear indicator 18B, etc. As the wear progresses, the wear indicator 18B is first exposed and removed, etc.

The wear indicators 18B, 20B, 22B, 24B, 26B, 28B, 30B, 32B are preferably configured as different colorations of the wear layer 12B. The wear indicators 18B, 20B, 22B, 24B, 26B, 28B, 30B, 32B can thus visually indicate the respective states of wear. Preferably, the wear indicators 18B, 20B, 22B, 24B, 26B, 28B, 30B, 32B can represent a color spectrum—for example, blue for the wear indicator 18B to red for the wear indicators 32B. For example, the wear indicator 18B can be dark blue, the wear indicator 20B light blue, the wear indicator 22B dark green, the wear indicator 24B light green, the wear indicator 26B yellow, the wear indicator 28B orange, the wear indicator 30B light red, and/or the wear indicator 32B dark red. The cover layer 16 and the part interior 14 can preferably not be colored, or be colored with a different color.

Figure 3:
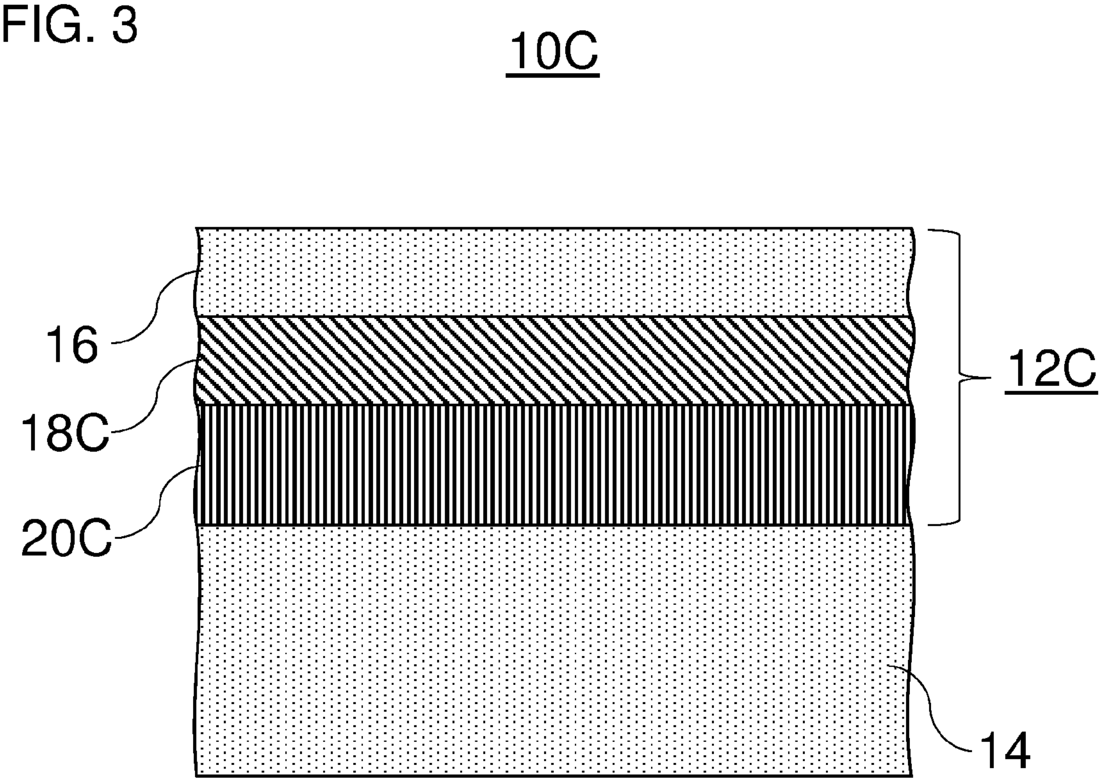
FIG. 3 is a schematic sectional view through an unworn wear part according to an exemplary embodiment of the present disclosure.

FIG. 3 shows the wear part 10C, with the wear layer 12C formed of the optional cover layer 16 and the wear indicators 18C and 20C. The wear indicators 18C and 20C are each layers or portions of layers of the wear layer 12C. In a direction from the outside towards the part interior 14, the wear indicator 18C follows the cover layer 16. The wear indicator 20C follows the wear indicator 18C, etc. As wear progresses, the wear indicator 18C is first exposed and removed, etc.

The wear indicators 18C, 20C are preferably configured as different colors of the wear layer 12B. The wear indicators 18C, 20C can therefore indicate visually the respective states of wear. Preferably, the wear indicator 18C can have a manufacturer-specific—for example, trademarked—color, e.g., a dark blue. The wear indicator 18C can thus indicate a state of wear, when it is exposed, which is acceptable and does not require any replacement of the wear part 10C. By contrast, the wear indicator 20C can preferably have a warning color—for example, yellow, orange, or red. The wear indicator 20C can thus, when it is exposed, indicate a state of wear, at which the wear part 10C must be replaced. The cover layer 16 and the part interior 14 can preferably not be colored, or can be colored with a different color.

In the exemplary embodiments of FIGS. 1 through 3, the respective wear indicators 18A-20C can be formed, in addition or as an alternative to the colorations, by, for example, an electrical conductor, a structuring, a texturing, a change in material, nanoparticle embedding, and/or a visual code.

Figure 4:
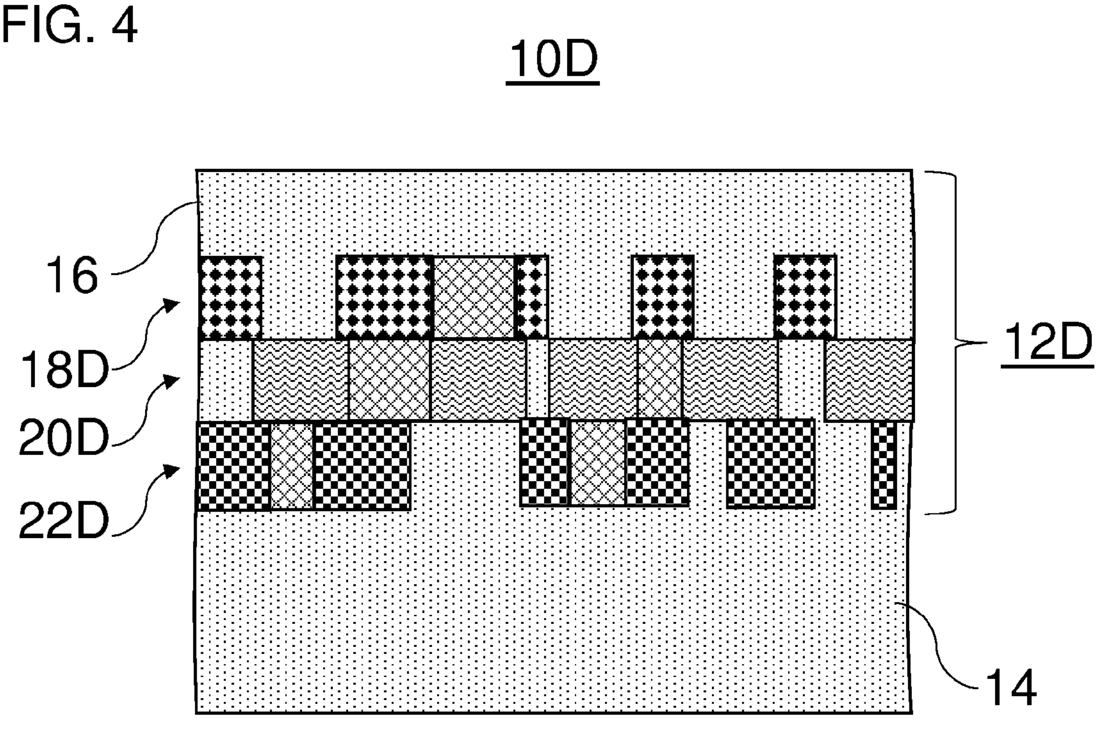
FIG. 4 is a schematic sectional view through an unworn wear part according to an exemplary embodiment of the present disclosure.

FIG. 4 shows the wear part 10D, with the wear layer 12D formed of the optional cover layer 16 and the wear indicators 18D, 20D, and 22D.

The wear indicators 18D, 20D, 22D are each visual codes which each have differently colored, individual regions spaced apart from each other. In a direction from the outside towards the part interior 14, the wear indicator 18D follows the cover layer 16. The wear indicator 20D follows the wear indicator 18D, etc. As wear progresses, the wear indicator 18D is first exposed and removed, etc.

For example, the wear indicator 18D can have several green regions in one layer, spaced apart from each other. The wear indicator 20D can have several yellow regions in one layer, spaced apart from each other. The wear indicator 22D can have several red regions in one layer, spaced apart from each other. Optionally, the wear indicators 18D, 20D, 22D can each have alternative or further colors. The cover layer 16 and the part interior 14 can preferably not be colored, or can be colored with a different color.

In the exemplary embodiment of FIG. 4, the wear indicators 18D-22D can be formed, in addition or as an alternative to the visual codes, by, for example, an electrical conductor, a structuring, a texturing, a change in material, and/or nanoparticle embedding.

Figure 5A:
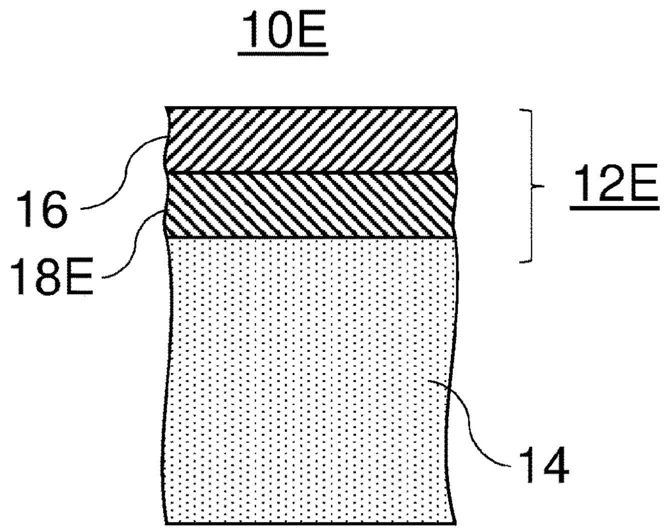
FIG. 5A is a schematic sectional view through an unworn wear part according to an exemplary embodiment of the present disclosure.

FIG. 5A shows the wear part 10E, with the wear layer 12E formed of the optional cover layer 16 and the wear indicator 18E. The wear indicator 18E is configured as a layer or a sheet-like portion of a layer of the wear layer 12C. The wear indicator 18E can, for example, be imprinted into the wear layer 12E by means of the additives mentioned, and be overprinted with the cover layer 16.

In a direction from the outside towards the part interior 14, the wear indicator 18E follows the cover layer 16. The part interior 14 follows the wear indicator 18E. With progressive wear, the wear indicator 18E is exposed and removed. Thereafter, the part interior 14 is exposed and removed.

Figure 5B:
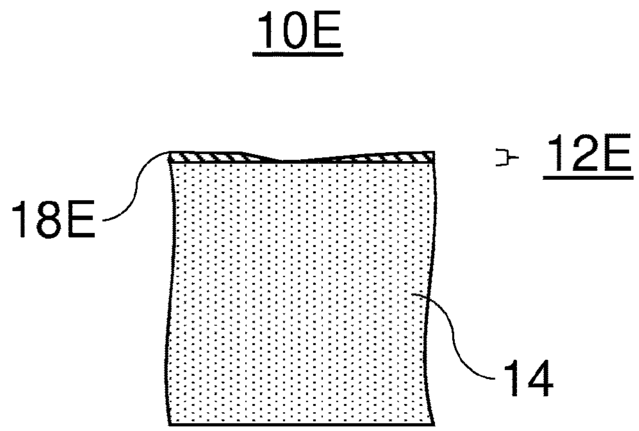
FIG. 5B is a schematic sectional view through the exemplary wear part of FIG. 5A in a worn state.

The wear indicator 18E is configured as an electrical conductor—for example, a conductor layer or a conductor track. The wear indicator 18E can be integrated into a circuit. If the wear indicator 18E, as shown in FIG. 5B, has been removed (for example, at points or over regions), the corresponding circuit is changed or interrupted. This can then lead, for example, to the generation of a warning signal indicating the wear of the wear part 10E. The cover layer 16 and the part interior 14 can preferably be electrical nonconductors. In this context, the changing conductivity of the wear indicator 18E can also be monitored during the progressive removal thereof, so that a statement about the progressive course of wear can also be made.

Figure 5C:
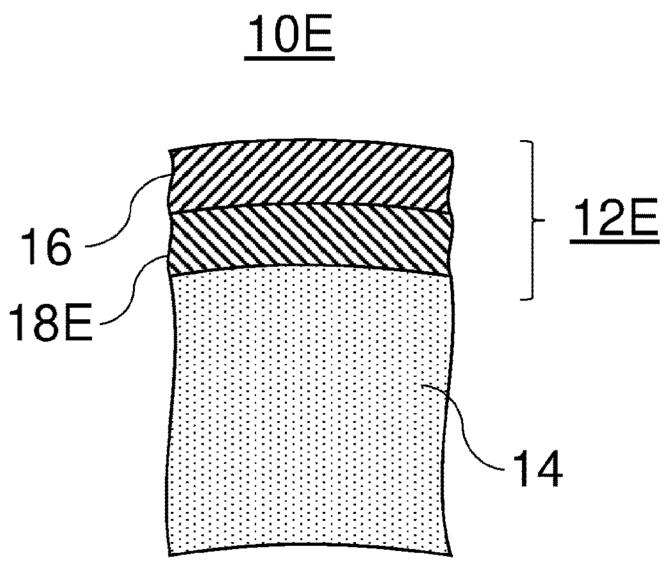
FIG. 5C is a schematic sectional view through the exemplary unworn wear part of FIG. 5A subjected to bending stress.

It is also possible that, as exaggeratedly illustrated in FIG. 5C, the wear part 10E is exposed to different loads (for example, bending, twisting, stretching, compression, etc.) during operation. These loads or stresses may result in a temporary or permanent change in shape of the wear indicator 18E (for example, bending, twisting, stretching, compressing, etc.), which may result in a change in the electrical properties of the wear indicator 18E. For example, during the deformation of the wear indicator 18E, its electrical resistance can change.

This change can be metrologically detected and evaluated, so that a load state of the wear part 10E can be deduced—for example, in comparison to a strain gauge). For example, it can thus be recognized if a maximum permissible deformation of the wear part 10E has been exceeded, such that maintenance of the machine or replacement of the wear part 10E may be necessary. Alternatively or additionally, load cycles can be monitored. By means of, for example, a change in resistance during deformation, the load cycles can also be counted, for example. As a result, knowledge can be gained about the number of changes in shape, and thus about the expected service life.

Figure 6:
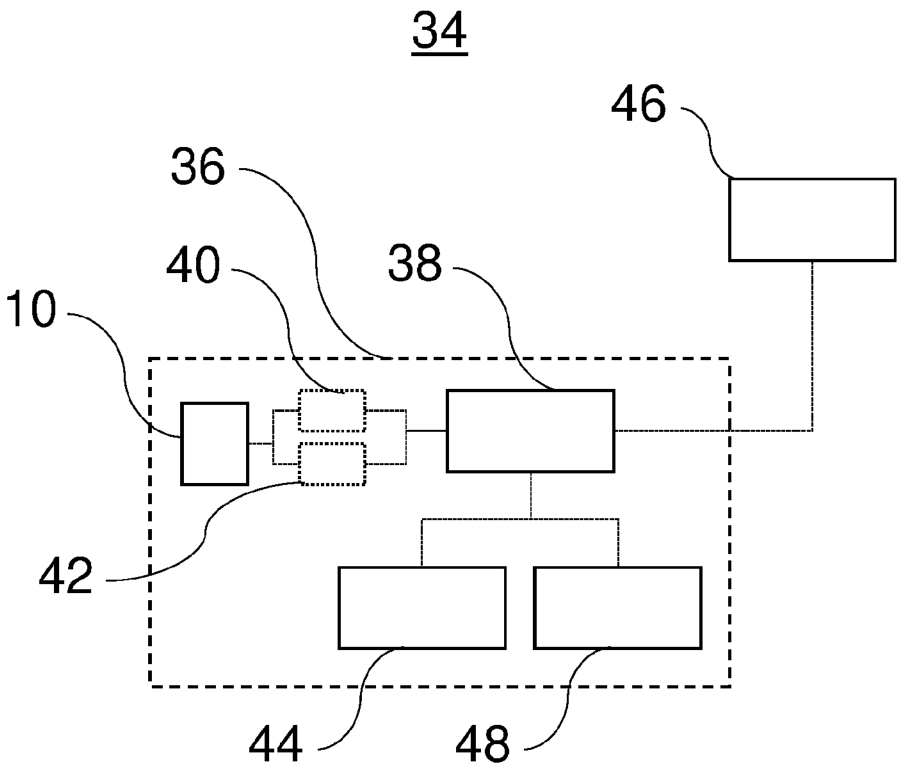
FIG. 6 shows a schematic illustration of a device for monitoring wear.

FIG. 6 shows a device 34 for monitoring wear of the wear part 10 in a machine 36. The wear part 10 can be configured, for example, like one of the wear parts 10A-10E explained with reference to FIGS. 1 through 5C.

The device 34 has a monitoring device 38. The monitoring device 38 is configured to monitor the wear part 10 with respect to its wear indicator(s). Preferably, the monitoring device 38 can output an indication signal when a wear indicator indicates the respective state of wear.

Depending upon the design of the at least one wear indicator of the wear part 10 to be monitored, the monitoring device 38 can be connected to different other systems.

For example, the device 34 can have an optical sensor 40 if the at least one wear indicator of the wear part 10 is configured as an electrical conductor. The optical sensor 40 can be configured as a camera, for example. The optical sensor 40 can be situated in the machine 36 for the purpose of detecting the wear part 10—preferably the wear layer of the wear part 10—in its position of use. For example, the optical sensor 40 can detect the wear part 10 during operation and/or during pauses in operation of the machine 36. Detection signals of the optical sensor 40 can be transmitted to the monitoring device 38 and evaluated by the monitoring device 38. If the wear indicator is exposed due to wear of the wear part 10, the signal of the optical sensor 40 can indicate the wear indicator. The monitoring device 38 can detect the wear indicator in a signal from the optical sensor 40, e.g., by means of an image recognition algorithm (for example, color detection algorithm, color code recognition algorithm, structure recognition algorithm, texture recognition algorithm, etc.).

For example, the device 34 can have an electrical circuit 42 if the at least one wear indicator of the wear part 10 is configured to output an electrical indication. The electrical circuit 42 is connected to the wear indicator (or the wear indicators) when the wear part 10 is in the unworn state. The monitoring device 38 monitors at least one electrical parameter (for example, resistance, current, voltage) of the electrical circuit 42 during operation and/or during pauses in operation of the machine 36 comprising the wear part 10.

If the electrical circuit 42 is interrupted—for example, due to a removal of the wear indicator at a point or as a whole—the monitoring device 38 can output an indication signal. It is also possible for the monitoring device 38 to output a (for example, further) indication signal in the event of a preferably permanent change in an electrical parameter of the electrical circuit 42—for example, due to the partial removal of the wear indicator or the complete removal of one of the wear indicators.

Additionally or alternatively, the monitoring device 38 can determine a load state of the wear part 10 as a function of the magnitude of the temporary change, in the event of a preferably temporary change in the electrical parameter of the electrical circuit. The monitoring device 38 can output a signal indicating the determined load state. Alternatively or additionally, the monitoring device 38 can output a signal when the determined load state is greater than a prespecified maximum load state. The prespecified maximum load state can in each case be predefined in a manner specific to the wear part—for example, as a value stored in the monitoring device 38.

Additionally or alternatively, the monitoring device 38 can determine (for example, count) a number of load cycles as a function of a number of preferably temporary changes in the electrical parameter. The monitoring device 38 can output a signal indicating the number of load cycles, and/or a signal if the determined number of load cycles is greater than a prespecified maximum load cycle number. The prespecified load cycle number can in each case be predefined in a manner specific to the wear part—for example, as a value stored in the monitoring device 38.

The monitoring device 38 can output the indication signal or the indication signals, and, optionally, further signals to be output, according to the requirements and configuration of the device 10. For example, the device 34 can have a local user interface 44, a remote user interface 46, and/or a control unit 48.

For example, the monitoring device 38 can output the indication signal, and, optionally, further signals to be output, visually, acoustically, and/or haptically by means of the local user interface 44. The local user interface 44 may preferably be a machine user interface of the machine 36 or a system user interface of a system in which the machine 36 is included.

Alternatively or additionally, the monitoring device 38 can output the indication signal, and, optionally, further signals to be output, to the remote user interface 46. The remote user interface 46 can be situated, for example, at a manufacturer of the machine 36 or the wear part 10. The remote user interface 44 can be reached, for example, by means of a web-based connection—for example, by means of TCP/IP or another Internet-enabled protocol.

Alternatively or additionally, the monitoring device 38 can output the indication signal, and, optionally, further signals to be output, to a control unit 48 of the machine 36. The control unit 48 can adjust operation of the machine 36 when the indication signal is received. For example, the control unit 48 can stop the machine 36 or reduce power if the indication signal indicates that the wear layer of the wear part 10 has been completely removed and/or that the wear part 10 has to be replaced.

It is possible that the monitoring device 38 is part of the local control unit 48 or a server-based, remote machine monitoring system.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, independently of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or the configuration of the first part interior, of the wear layer, and/or of the wear indicator of independent claim 1. All ranges specified herein are to be understood as disclosed in such a way that all values falling within the respective range are individually disclosed, e.g., also as the respective preferred narrower outer limits of the respective range.

LIST OF REFERENCE SIGNS

10-10E Wear part
12A-12E Wear layer
14 Part interior
16 Cover layer
18A-32B Wear indicator
34 Device for monitoring wear
36 Machine
38 Monitoring device
40 Optical sensor
42 Electrical circuit
44 Local user interface
46 Remote user interface
48 Control unit

The invention claimed is:

1. A device for monitoring a state of wear, the device comprising:
- a wear part, comprising:
  - a part interior; and
  - a wear layer produced by additive manufacturing, covering the part interior and having a wear indicator which is produced by additive manufacturing, and which is configured to indicate a state of wear of the wear part if the wear indicator is at least one of exposed and removed due to wear, wherein the wear indicator is formed at least in part by nanoparticle embedding of the wear layer, at least in regions or in layers; and
  - a monitoring device configured to monitor the wear part with respect to the wear indicator, wherein:
    - the monitoring device is configured to output an indication signal if the wear indicator indicates the state of wear; and
    - the monitoring device is configured to output the indication signal in at least one of the following ways: visually, acoustically, haptically, to a local user interface and to a remote user interface.

2. The device according to claim 1, wherein:
- the wear layer has a cover layer which covers the wear indicator when the wear part is in an unworn state; or
- the wear indicator, when the wear part is in the unworn state, forms a part surface of the wear part or is included in the part surface of the wear part.

3. The device according to claim 1, wherein the wear indicator is further formed at least in part by at least one of:
- an electrical conductor; and
- a visual code.

4. The device according to claim 1, wherein:
- the wear layer has a further wear indicator, which differs from the wear indicator, arranged closer to the part interior than the wear indicator, which is additively manufactured, and is configured to indicate a further state of wear of the wear part if the further wear indicator is at least one of exposed and removed due to wear; and, optionally,
- the wear layer has an other, further wear indicator, which differs from the wear indicator and the further wear indicator, arranged closer to the part interior than the further wear indicator, which is additively manufactured, and is configured to indicate another, further state of wear of the wear part if the other further wear indicator is at least one of exposed and removed due to wear.

5. The device according to claim 4, wherein the further wear indicator and, optionally, the other further wear indicator is formed at least in part by at least one of:
- an electrical conductor;
- at least one of coloring, structuring, texturing, change in hardness, change in material, and/or nanoparticle embedding of the wear layer, at least in regions or in layers; and
- a visual code.

6. The device according to claim 4, wherein:
- the wear indicator and the further wear indicator and, optionally, the other further wear indicator are each formed by a layer-wise coloring of the wear layer.

7. The device according to claim 1, wherein:
- the wear part is a container clamp for holding a container, a container guide for guiding containers, a closure channel for guiding container closures, a blocking star for interrupting a container flow, a bushing, a toothed wheel, a roller, or a guide.

8. The device according to claim 1, further comprising:
- an optical sensor arranged to detect the wear part,
- wherein the monitoring device is configured to detect the wear indicator from a signal from the optical sensor.

9. The device according to claim 1, further comprising:
- an electrical circuit connected to the wear indicator when the wear part is in the unworn state;
- wherein the monitoring device is configured to monitor at least one electrical parameter of the electrical circuit.

10. The device according to claim 9, wherein the monitoring device is further configured to do at least one of the following:
- output the indication signal in the event of an interruption of the electrical circuit;
- output the indication signal in the event of a change in the at least one electrical parameter;
- determine a load state of the wear part as a function of a degree of change in the event of a change in the at least one electrical parameter, and to output at least one of a signal indicating the determined load state, and a signal if the determined load state is greater than a prespecified maximum load state; and
- determine a number of load cycles as a function of a number of changes in the at least one electrical parameter, and to output at least one of a signal indicating the number of load cycles, and a signal if the determined number of load cycles is greater than a prespecified maximum load cycle number.

11. The device according to claim 4, wherein:
- the monitoring device is configured to monitor the wear part with respect to the further wear indicator; and, optionally,
- the monitoring device is configured to monitor the wear part with respect to the other, further wear indicator.

12. The device according to claim 1, wherein:
- the monitoring device is configured to output the indication signal to a control unit; and the monitoring device is part of at least one of a local control unit and a server-based remote machine monitoring system.

13. The device according to claim 1, further comprising: a machine having the wear part, wherein the monitoring device is configured to adapt an operation of the machine if the wear indicator indicates the state of wear.

14. The device according to claim 1, wherein the wear part is for a container processing system.

15. The device according to claim 1, wherein the wear layer and the wear indicator are produced by 3-D printing.

16. The device according to claim 3, comprising at least one of the following features:

the electrical conductor is a conductor track or a conductive layer, and the visual code is a color code, a barcode, or a matrix barcode.

17. The device according to claim 6, wherein the wear indicator and the further wear indicator and, optionally, the other further wear indicator are each formed by a layer-wise coloring of the wear layer in a manner of a traffic light system and/or with a color gradient.

* * * * *